(12) United States Patent
Wikman et al.

(10) Patent No.: US 8,069,219 B2
(45) Date of Patent: Nov. 29, 2011

(54) METHOD AND APPARATUS FOR IMPLEMENTING A MOBILE WEB SERVER BASED SYSTEM

(75) Inventors: Johan Wikman, Helsinki (FI); Ferenc Dosa, Helsinki (FI); Katja Nykänen, Helsinki (FI); Mikko Tarkiainen, Espoo (FI)

(73) Assignee: Nokia Corporation, Espoo (FI)

( * ) Notice: Subject to any disclaimer, the term of this patent is extended or adjusted under 35 U.S.C. 154(b) by 1884 days.

(21) Appl. No.: 11/071,771

(22) Filed: Mar. 3, 2005

(65) Prior Publication Data
US 2006/0200541 A1 Sep. 7, 2006

(51) Int. Cl.
*G06F 15/16* (2006.01)
(52) U.S. Cl. ..... 709/217; 709/200; 709/222; 455/414.2; 455/452.1; 455/452.2; 718/105
(58) Field of Classification Search .................. 709/217, 709/223; 455/414.2, 452.2; 718/105
See application file for complete search history.

(56) References Cited

U.S. PATENT DOCUMENTS

| | | | | |
|---|---|---|---|---|
| 5,511,208 | A * | 4/1996 | Boyles et al. | 709/223 |
| 6,212,556 | B1 | 4/2001 | Arunachalam | |
| 6,377,961 | B1 * | 4/2002 | Ryu | 1/1 |
| 6,519,241 | B1 | 2/2003 | Theimer | |
| 6,519,568 | B1 | 2/2003 | Harvey et al. | |
| 6,587,882 | B1 * | 7/2003 | Inoue et al. | 709/227 |
| 6,647,001 | B1 | 11/2003 | Bhagavath et al. | |
| 6,704,295 | B1 * | 3/2004 | Tari et al. | 370/270 |
| 6,779,032 | B1 * | 8/2004 | Hericourt | 709/226 |
| 7,219,223 | B1 * | 5/2007 | Bacchus et al. | 713/150 |
| 7,536,445 | B2 * | 5/2009 | Kinoshita | 709/217 |
| 2003/0005096 | A1 * | 1/2003 | Paul et al. | 709/222 |
| 2004/0071087 | A1 * | 4/2004 | Siev et al. | 370/235 |
| 2004/0181604 | A1 | 9/2004 | Immonen | |
| 2004/0186918 | A1 | 9/2004 | Immonen | |
| 2004/0203824 | A1 * | 10/2004 | Mock et al. | 455/452.1 |
| 2004/0250252 | A1 | 12/2004 | Khartabil | |
| 2004/0250253 | A1 | 12/2004 | Khartabil | |
| 2005/0004968 | A1 * | 1/2005 | Mononen et al. | 709/200 |

(Continued)

FOREIGN PATENT DOCUMENTS
WO WO 01/91404 A2 11/2001

OTHER PUBLICATIONS
U.S. Appl. No. 10/822,641, filed Apr. 12, 2004, Hamynen et al.

(Continued)

*Primary Examiner* — Thu Ha Nguyen
(74) *Attorney, Agent, or Firm* — Ditthavong Mori & Steiner, P.C.

(57) ABSTRACT

A method and apparatus for facilitating access to mobile Web servers by any requesting entity from within a network. The mobile Web servers are allocated Uniform Resource Locators (URL), which are discoverable by the requesting entities through conventional use of search engines, service discovery mechanisms, registries, etc. A direct communication link exists between the mobile Web servers and the gateway to allow specific information to be obtained from the mobile Web servers and subsequently advertised by the gateway in the form of an indexed list. The indexed list allows the requesting entities to browse the mobile Web servers sponsored by the gateway for any location specific content/data that may be of interest to the requesting entities. The mobile Web servers facilitate the ability for the requesting entities to influence the content/data that is offered by the mobile Web servers.

32 Claims, 9 Drawing Sheets

U.S. PATENT DOCUMENTS

| | | | |
|---|---|---|---|
| 2005/0014489 A1* | 1/2005 | Zhigang | 455/414.2 |
| 2006/0077926 A1* | 4/2006 | Rune | 370/328 |
| 2006/0130064 A1* | 6/2006 | Srivastava | 718/102 |
| 2006/0143432 A1* | 6/2006 | Rothman et al. | 713/2 |
| 2006/0161635 A1* | 7/2006 | Lamkin et al. | 709/217 |
| 2006/0200541 A1* | 9/2006 | Wikman et al. | 709/223 |
| 2006/0242632 A1* | 10/2006 | Orsolini et al. | 717/140 |
| 2009/0129319 A1* | 5/2009 | Buddhikot et al. | 370/328 |

OTHER PUBLICATIONS

U.S. Appl. No. 10/921,072, filed Aug. 18, 2004, Punaganti Venkata et al.

U.S. Appl. No. 10/884,793, filed Jul. 1, 2004, Punaganti Venkata.

Takahashi, "A Mobile Portal Service to Provide Location Dependent Information", http://www.w3.org/Mobile/posdep/NTTindex.html printed from the Internet on or about Jan. 27, 2005.

* cited by examiner

METHOD AND APPARATUS FOR IMPLEMENTING A MOBILE WEB SERVER BASED SYSTEM

FIELD OF THE INVENTION

This invention relates in general to Web servers, and more particularly to a method, system, and apparatus that facilitates Web server functionality to be hosted by a mobile device.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

In addition, mobile devices today are themselves acting as content providers, whereby content that is resident within the mobile device itself may be posted to the Internet. One particular mobile posting process that has gained considerable popularity is a process that has been coined as "moblogging". The term "moblog" is a portmanteau of "mobile" and "weblog", where "weblog" is a Web application that provides periodic posts to a common Web page on the Internet. Thus, mobile devices today may not only access information from Web servers existing on the Internet, but may also themselves host Web server functionality as a content provider for browsers and other clients within the Internet and mobile networks.

Some applications, content, and services that might be available within a mobile device may be of little value, however, until the prospective browsers and clients are made aware of its existence. Thus, mobile devices acting as mobile Web servers create a new paradigm shift, since Web server content previously indexable and accessible on stationary Web servers, is now located within a mobile device. As such, conventional mechanisms employed by search engines, registries, and portals find themselves unable to take anything but the content into account when attempting to provide indexable access to the wireless Web servers. In particular, whereas prior art mobile Web servers may be located by conventional means, other aspects of the mobile Web servers, such as their context and location, are ignored by those conventional means. Thus, valuable information relating to the mobility of the mobile Web servers is not gathered by conventional search means and thus cannot be discovered by the browsing client.

Web servers today are generally stationary and are typically maintained by dedicated professionals. The content that is provided by the Web servers is also generally static and substantially obtained from files existent within a file system or database. Thus, the data/content contained within the stationary Web servers is subject to change at the whim of the professionals that are assigned to manage it. Certainly, the data/content contained within today's stationary Web servers is not configured to be changed, or altered, at the request of the browser or client that is accessing the stationary Web server. That is to say, that the data contained within the stationary Web servers cannot be "personalized" by the requesting entities to the extent that the data being accessed is customized by the stationary Web server administrator according to the needs and desires of the requesting entities. As such, the only information available to the requesting entities, is that information that has been previously made available based on decisions that are totally independent of the needs and desires of the requesting entities.

It can be seen, therefore, that conventional methods that are used to configure and access stationary Web servers, while applicable, are deficient when tasked with the configuration and access of their mobile Web server counterparts. Furthermore, while administrators of stationary Web servers do not necessarily take an active role in generating the stationary Web server's content, administrators of the mobile Web servers are almost always in attendance and thus may take and active role in generating the mobile Web server's content. Thus, a plethora of possibilities begins to unfold for the mobile Web server, when consideration is given to the "personalization" that may be afforded by the mobile Web server administrators, since the requesting entities may play a role in causing the administrators to customize the data/content offered by the mobile Web servers.

Accordingly, there is a need in the mobile communications industry for the administration of mobile Web servers, such that their data and services may be adaptively focused and tailored to the mobile Web server's context, such as its location. A further need exists for a system and methodology that provides enhanced access capability to the mobile Web servers, such that requesting entities may customize their requests based on the context of the mobile Web server. The enhanced access capability may also allow the mobile Web server owner to implement a level of "personalized" access control to the mobile Web server. The present invention fulfills these and other needs, and offers other advantages over the prior art approaches.

SUMMARY OF THE INVENTION

To overcome limitations in the prior art described above, and to overcome other limitations that will become apparent upon reading and understanding the present specification, the present invention discloses a method, system, and apparatus for providing mobile Web server functions. The present invention allows requesting entities to peruse an indexed list of mobile Web servers and their context related data to assist in selection of a mobile Web server containing information relevant to the requesting entities. The mobile Web servers are hosted by an intervening gateway that provides the indexed list. The mobile Web servers also allow the requesting entities to influence, to some limited extent, the content/data provided by the mobile Web servers.

In accordance with one embodiment of the invention, a method of accessing a mobile Web server via a gateway within a network comprises compiling a list of mobile Web servers hosted by the gateway, receiving mobile Web server requests from requesting entities within the network, indexing a group of mobile Web servers in response to the mobile Web server requests, and providing access to the indexed group of mobile Web servers. The access to a selected mobile Web server of the indexed group of mobile Web servers is optionally provided to the requesting entities by the selected mobile Web server.

In accordance with another embodiment of the invention, a mobile Web server based content system comprises a plurality of mobile terminals located within the content system, where each mobile terminal has attributes indicative of a context of the mobile terminal, a gateway that is coupled to the plurality of mobile terminals and is adapted to index the attributes of the plurality of mobile terminals into an attribute list, and a requesting entity that is coupled to the gateway and is adapted to send requests to a portion of the plurality of mobile terminals having attributes that correspond to the attribute list. The portion of the plurality of mobile terminals is adapted to send data to the requesting entity in response to the requests.

In accordance with another embodiment of the invention, a mobile terminal that is capable of being wirelessly coupled to a network which includes requesting entities gaining access to the mobile terminal via a gateway. The mobile terminal comprises a memory that is capable of storing a telemetry module and an intelligent configuration agent, a processor that is coupled to the memory and is configured by the telemetry module to maintain position information associated with the mobile terminal and is configured by the intelligent configuration agent to provide context specific information associated with the mobile terminal to the gateway, and a transceiver that is configured to receive requests from the requesting entities and is configured to provide data in response to the received requests.

In accordance with another embodiment of the invention, a computer-readable medium having instructions stored thereon which are executable by a mobile terminal for providing content to a gateway. The instructions perform steps comprising obtaining location updates relative to a position of the mobile terminal, communicating the location updates to the gateway, communicating information to the gateway that is context specific to the mobile terminal, and receiving requests from the gateway for data contained within the mobile terminal. The requests are received in response to the location and other context related information of the mobile terminal.

In accordance with another embodiment of the invention, a gateway is coupled to a network to facilitate a mobile Web server based content search. The gateway comprises a means for receiving location updates from a plurality of mobile terminals, a means for receiving context specific information from a plurality of mobile terminals, a means for providing a list of the location and the context specific information associated with the plurality of mobile terminals to the network, and a means for receiving requests for data from the network in response to the provided list.

In accordance with another embodiment of the invention, a computer-readable medium having instructions stored thereon which are executable by a gateway. The instructions perform steps comprising receiving location updates from a plurality of mobile terminals, receiving context specific information from a plurality of mobile terminals, providing a list of the location and the context specific information associated with the plurality of mobile terminals to the network, and receiving requests for data from the network in response to the provided list.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to facilitating access to mobile Web servers by any requesting entity within the Internet, or other network, such as a wireless network. The mobile Web servers are allocated Uniform Resource Locators (URL), which are discoverable by the requesting entities through conventional use of search engines, service discovery mechanisms, registries, etc. The URLs are accessed by the requesting entities as if they were in direct communication with the respective mobile Web servers. A gateway is introduced as a transparent intervention entity, however, such that among other features, valuable indexing of the mobile Web servers and their context-specific content/data may be facilitated. A direct communication link exists between the mobile Web servers and the gateway to allow specific information to be obtained from the mobile Web servers and subsequently advertised by the gateway. Such an exchange allows the requesting entities to browse the mobile Web servers sponsored by the gateway for any context specific content/data that may be of interest to the requesting entities.

Figure 1:
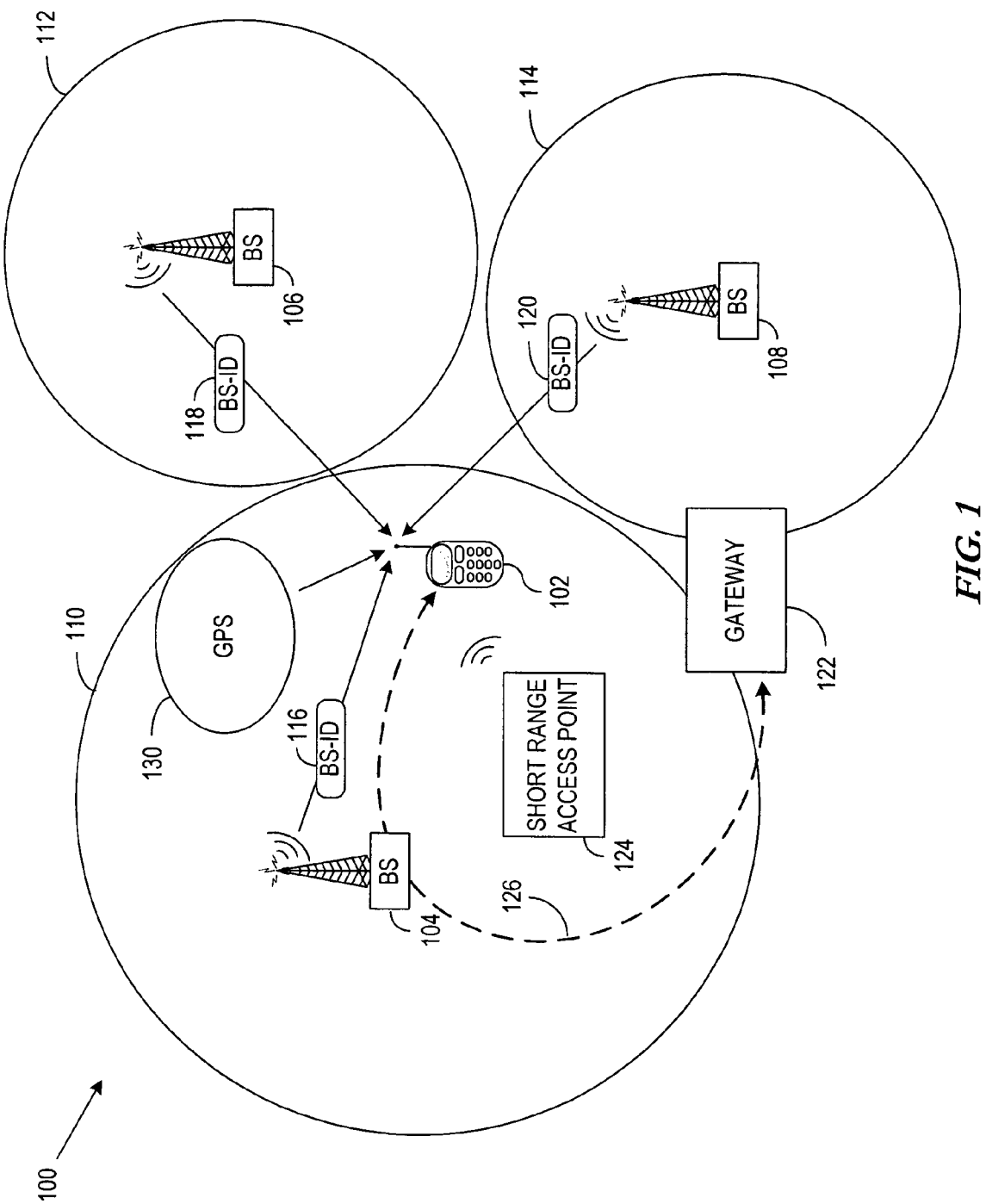
FIG. 1 illustrates an exemplary wireless network environment in accordance with the present invention.

One of the most important context-specific attributes associated with the mobile Web servers of the present invention is their location, which may be determined using one of several available methodologies. The mobile Web server's location may then be used by the gateway as an indexing parameter for advertisement of context-specific content/data that may be provided by that particular mobile Web server. FIG. 1 is a block diagram generally illustrating a number of representative examples in which a mobile Web server may obtain location information about itself.

Communication system 100 of FIG. 1 may utilize a General Packet Radio Service (GPRS) network as a communications backbone, which may then provide a packet-switched service for the Global System for Mobile Communications (GSM). GPRS thus provides actual packet radio access for mobile GSM and time-division multiple access (TDMA) users, and is ideal for Wireless Application Protocol (WAP) services. While the exemplary embodiments of FIG. 1 are generally described in connection with GPRS/GSM, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

In a mobile radio network such as a GSM network, the area to be covered is divided into multiple areas, generally referred to as "cells." The mobile radio network is assigned a set of frequencies, and each cell is assigned one (or more) of these frequencies. Neighboring cells will not use the same frequencies, and frequencies are re-used only where the distance is sufficiently large as to avoid interference. When a mobile terminal moves from one cell to another, an automatic channel/frequency change will occur, which is generally referred to as "handoff" or "handover."

Referring to FIG. 1, a mobile terminal 102, acting as a mobile Web server in accordance with the present invention, includes the hardware, software, Subscriber Identity Module (SIM), etc. as necessary to communicate with the GSM network. The GSM network includes multiple Base Station Subsystems (BSSs), each of which is controlled by a Base Station Controller (BSC). The BSS is responsible for maintaining radio connections to the mobile terminals, coding and decoding, etc. The BSS is a logical entity physically implemented via the BSC and a set of Base Transceiver Stations (BTS), commonly referred to simply as Base Stations (BS), that are controlled by the BSC. In FIG. 1, three of the many available base stations are illustrated, including BS 104, 106, 108. Each BS includes the radio equipment, such as antennas, signal processing, amplifiers, etc. used to facilitate the communication between the BSC and the mobile terminals. The wireless area served by a BS is generally referred to as a cell, such that cell 110 is served by BS 104, cell 112 is served by BS 106, and cell 114 is served by BS 108.

In a cellular network such as the exemplary GSM network portion illustrated in FIG. 1, a number of identifiers are used to identify the various network constituents. For example, the mobile terminals 102 are generally associated with an equipment identifier, and the user of the mobile terminal 102 is generally associated with a subscriber identifier (such as that provided by a SIM) as well as with an identifier such as a telephone number. In addition, several other identifiers are defined for managing subscriber mobility and addressing other network elements. For example, mobile terminal 102 acting within its mobile Web server capacity, may be assigned a URL by gateway 122, which may then be used by virtually any Internet browser (not shown) to access content/data that may be available from within mobile Web server 102.

In one embodiment, mobile Web server 102 maintains, for example, a Transmission Control Protocol/Internet Protocol (TCP/IP) connection 126 to gateway 122 via BS 104. TCP/IP connection 126 may then be used by mobile Web server 102 and gateway 122 to exchange Hypertext Transfer Protocol (HTTP) requests, in which context-specific information, e.g., location, telemetry, and other content/data, may be used by gateway 122 to create a unique search capability and valuable portal access to mobile Web server 102. It should be noted that while only a single gateway 122 and mobile Web server 102 are illustrated, it is appreciated that a plurality of mobile Web servers may be hosted by a single gateway 122, such that the respective content/data contained within the mobile Web servers may be indexed and offered for access by gateway 122 to any requesting entity. It should be noted, that the "hosting" function of gateway 122 as discussed herein merely connotes the concept that access to the mobile Web servers and the mobile Web servers' content may be facilitated by gateway 122. No other meaning normally associated with hosting functions is to be attached to the function of gateway 122, or any of the other gateways discussed herein.

In one embodiment, the location of mobile Web server 102 may be established through the use of one or more communication channels between mobile Web server 102 and BS 104-108, which may then be used by mobile Web server 102 to identify its position to gateway 122 via path 126. For example, mobile Web server 102 can perform signal strength measurements for the channels associated with BS 104-108, such that mobile Web server 102 may "triangulate" its position with respect to the reported positions of BS 104-108, where differentiation between BS 104-108 is accomplished via BS-ID 116-120, respectively. Alternately, the location information may be generated at one of BS 104-108 and subsequently reported to mobile Web server 102.

In another embodiment, the location of mobile Web server 102 may be established where a greater degree of location accuracy is desired, e.g., through the use of Global Positioning System (GPS) 130. In such an instance, mobile Web server 102 may communicate with GPS 130 through an internal GPS receiver (not shown) to receive location information that is accurate to within several meters to several centimeters depending upon the particular algorithm that is used.

In another embodiment, short range technologies such as Wireless Local Area Network (WLAN), Bluetooth, or other radio technologies such as Radio Frequency Identification (RFID), may be used to provide location information to mobile Web server 102. Bluetooth, for example, is a computing and telecommunications industry specification that describes how mobile phones and other mobile terminals can interconnect with each other and with home and business phones/computers using a short-range wireless connection. A Bluetooth hot spot is an area that has a readily accessible wireless network available to multiple people within that area. The Bluetooth hot spot is thus a location such that when a device equipped with Bluetooth circuitry, e.g., mobile Web server 102, is within range of a Bluetooth "access point," e.g., short range access point 124, the user can connect wirelessly to the access point to gain location information associated with the access point. Thus, once mobile Web server 102 is within range of short range access point 124, the location of short range access point 124 may be transmitted to mobile Web server 102, so that the location of mobile Web server 124 is made equivalent to the location of the access point.

Short range access points 124 may be distributed throughout an area at particular venues, such as at restaurants, movie theatres, concert halls, historic sites, scenic views, etc. Once mobile Web server 102 comes within access range of any of the short range access points, the mobile Web server's location, as provided by the short range access point, may be updated within gateway 122 via path 126. Accordingly, the location of mobile Web server 102 may have desirable implications to others who may have other information concerning the location.

For example, the location of mobile Web server 102 may be identified by short range access point 124 as being at Helsinki Hartwall Arena. Accordingly, those requesting clients having particular knowledge of Helsinki Hartwall Arena may understand that a public concert is currently underway at that venue. Further access requests pertaining to the URL associated with mobile Web server 102, may reveal that mobile Web server 102 has taken recent photographs of the concert using its built-in camera capabilities. The requesting entities may then request uploads of the concert photographs taken by mobile Web server 102 via gateway 122. In this way, it can be seen that the present invention contemplates providing personalized content/data that is directly dependent upon the location of the mobile Web server and that is stored locally within mobile Web server 102.

Other data requests are also contemplated, which may be accommodated by mobile Web server 102. Real time audio/video streaming, for example, from mobile Web server 102 to a requesting entity may also be accommodated, provided that the appropriate streaming capabilities are implemented within mobile Web server 102. In such an instance, requesting entities unable to attend the public concert may nevertheless request audio and/or video streams from mobile Web server 102. Subject to the acceptance of the request, which may include appropriate consideration of the legal, e.g., copyright, and ethical implications of uploading content relating to a live public concert, mobile Web server 102 may create a real time, audio/video stream of the public concert to gateway 122 via path 126, which may then be forwarded onto the requesting entities. A one-to-one correspondence may be created between mobile Web server 102 and a single requesting entity, or conversely, a one-to-many correspondence may be created to offer the audio/video stream to a multitude of requesting entities. In an alternate embodiment, the audio/video stream may be provided to gateway 122 from mobile Web server 102 and subsequently cached within gateway 122. From the cache, multiple audio/video stream(s) may then be created by gateway 122 in support of one or more requesting entities.

As stated above, content/data generated by mobile Web server 102 is personalized using location information associated with mobile Web server 102 in accordance with the present invention. An index containing entries of mobile Web server 102 and all other mobile Web servers hosted by gateway 122 may then be published for URL access from virtually any requesting entity. The index may then be used by the requesting entities to attempt access to the content/data that may be offered by the mobile Web servers.

Figure 2:
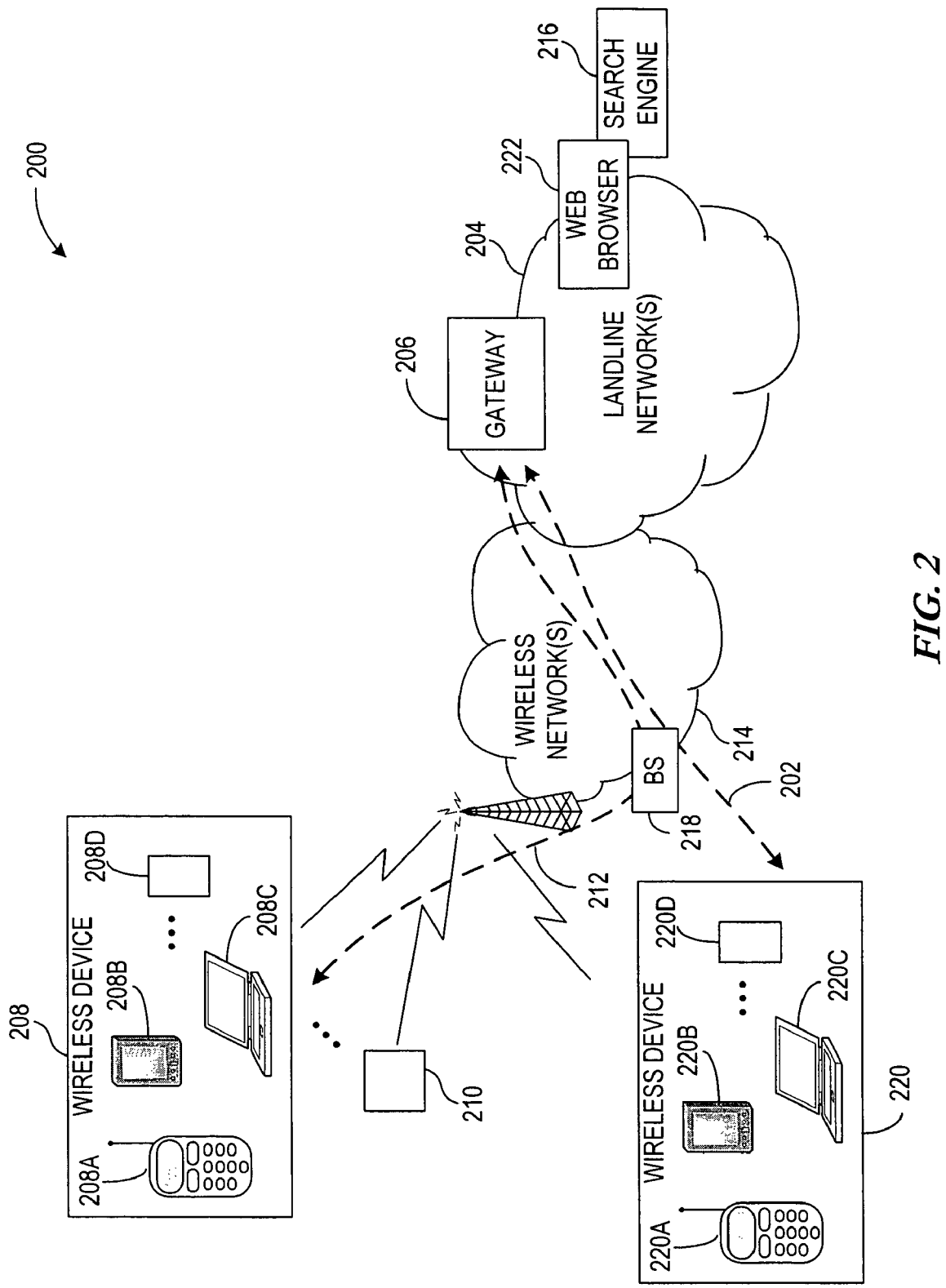
FIG. 2 illustrates an exemplary mobile Web server access network in accordance with the present invention.

Exemplary network 200 facilitating index access and subsequent exchange of personalized content/data is illustrated in FIG. 2, whereby mobile Web servers 208, 210 provide access to location based content/data to requesting entities, such as land based requesting entity 222 and mobile based requesting entity 220. In the example of FIG. 2, search engine 216 may be utilized by Web browser 222 to locate indexed information concerning mobile Web servers 208, 210 that is published by gateway 206. Gateway 206 may further serve as a Wireless Access Point (WAP) between mobile operator network 214 and landline network 204, whereby messages 202 and 212, e.g., HyperText Transport Protocol (HTTP) messages, exchanged between mobile terminals 208, 210, and 220 and Web browser 222 may be facilitated by gateway 206. Gateway 206 may also reside wholly within landline network 204, thus providing no such WAP connectivity, but nevertheless providing HTTP support. Mobile Web servers 208, 210 may include mobile phones 208A, Personal Digital Assistants (PDA) 208B, portable computing devices 208C, or other 208D wireless devices. Similarly, mobile requesting entity 220 may include mobile phones 220A, PDA 220B, portable computing devices 220C, or other 220D wireless devices.

HTTP message 202, as well as the HTTP requests sent from Web browser 222, may include index requests directed to gateway 206 concerning the mobile Web servers currently being hosted by gateway 206. Such requests may include location information, as well as any other telemetry information such as temperature, barometric pressure, elevation, velocity, acceleration, etc., and non-telemetry information, such as wall paper or tile configuration, that may be associated with the hosted mobile Web servers. The requests may also include requests for any other content/data that may be provided by the mobile Web server as discussed above in relation to mobile Web server 102 of FIG. 1.

In one embodiment, the location information provided by mobile Web servers 208, 210 to gateway 206 may include only the locations of the mobile Web servers themselves. In addition, search requests submitted by Web browser 222 via search engine 216, or mobile requesting entity 220, to gateway 206 may contain a single area of interest, which is communicated as a location tag within the search request. In such an instance, gateway 206 provides an indexed report of only those hosted mobile Web servers that lie within the location tag contained within each search request. The location tag may be represented, for example, by latitude/longitude coordinates, such as may be provided by GPS 130, or conversely may be represented by location attributes such as landmark titles, street addresses, city names, names of concert halls, restaurants, etc., as may be provided, for example, by short range access point 124.

In an alternate embodiment, the location tag provided within the search request may include an Area of Interest (AOI), whereby all mobile Web server locations within the AOI, as well as all known Locations of Interest (LOI) within the AOI, are indexed and reported to requesting entities 220 and 222 via gateway 206. Such an embodiment is contemplated for those occasions where the mobile Web server's reported location does not exactly match the requested location. Conversely, the requesting entity may be unsure of an exact location to place in its search request, but is aware of a general area of interest. For those occasions, the AOI may act as a perimeter of interest for a generalized location request.

For example, a requesting entity interested in the dining facilities available within the city of Tampere, Finland, may only have the GPS coordinates for downtown Tampere, but nevertheless wishes to obtain a list of dining facilities within a certain perimeter of interest surrounding the GPS coordinates. In such an instance, the GPS coordinates of Tampere, Finland, along with an AOI designating, for example, a 3-mile radius surrounding the GPS coordinates may be submitted within the search request. As a result, the indexed report submitted to the requesting entity by gateway 206 may include all mobile Web servers hosted by gateway 206 that lie within the AOI, as well as an indexed report of all dining facilities that lie within the AOI.

Once the indexed report is received, the requesting entity may then select a particular mobile Web server from the report. Once selected, the requesting entity may extend a request/command to the selected mobile Web server to visit one or more of the indexed dining facilities, so that a "snapshot" of the posted menu and ambiance for each dining facility may be provided by the mobile Web server to the requesting entity. As will be discussed in more detail below, the requesting entity is therefore able to customize the content provided by the mobile Web server through submission of a customized content request.

The customized content request may either be accepted, or rejected, by the mobile Web server. In one embodiment, if the customized content request is rejected by the mobile Web server, then other mobile Web servers not currently hosted by gateway 206 may be identified by the rejecting mobile Web server as being potential alternates that may be used to fulfill the rejected request. For example, mobile Web server 208 may be built using the Symbian Operating System (OS) General Technology (GT). Symbian GT provides a fully object-oriented design, preemptive multi-tasking, and full support for a client-server architecture. Symbian GT also provides a multimedia server for audio recording, playback, and image-related functionality, as well as a Personal Area Network (PAN) communication stack including infrared, Bluetooth and serial communications support. Further, Symbian GT also supports the Apache Web server, which when combined with the proximity detection capability of Symbian GT, allows identification of mobile Web servers that are in proximity to mobile Web server 208.

Figure 3:
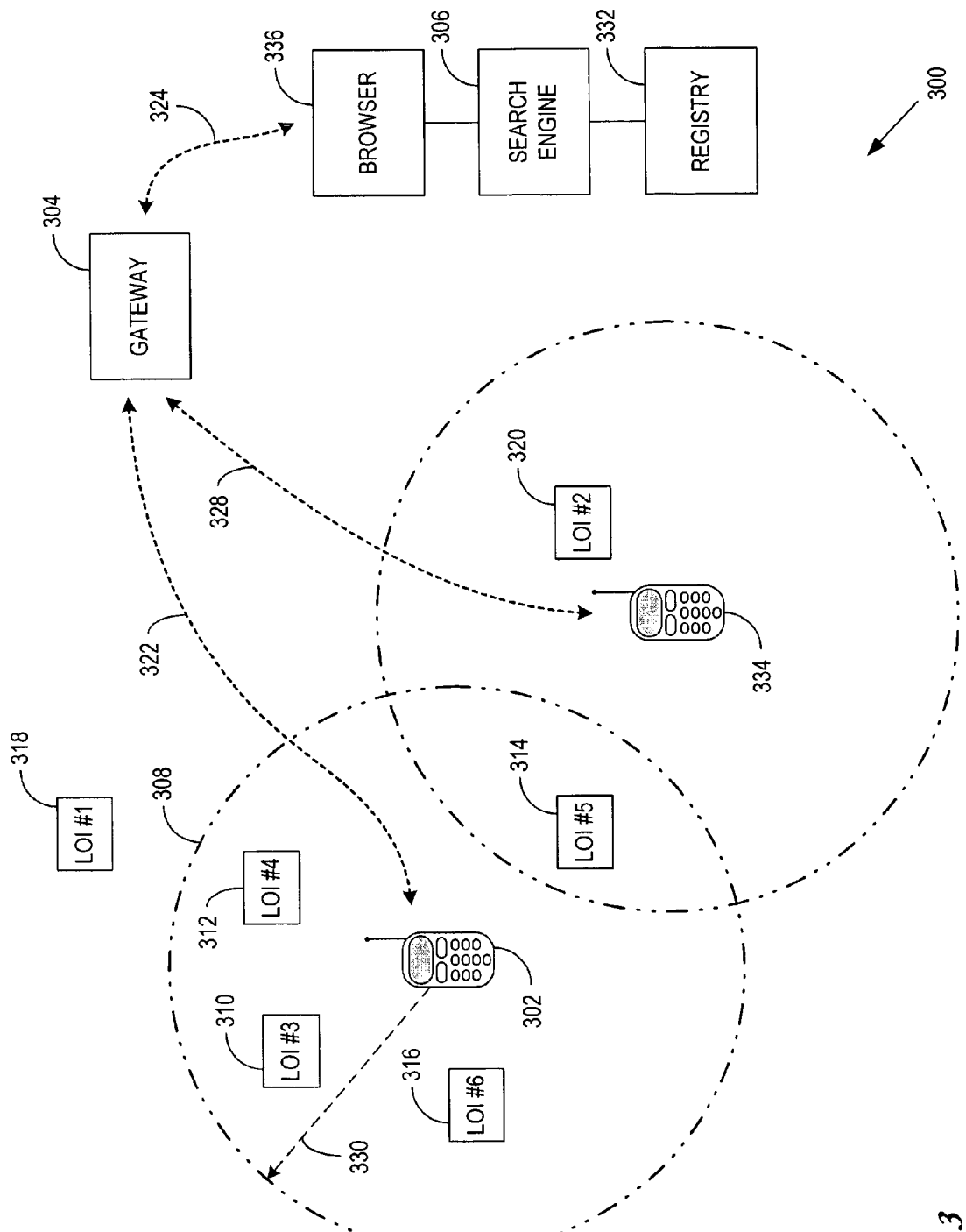
FIG. 3 illustrates an exemplary location sensitive block diagram in accordance with the present invention.

Such an exemplary embodiment is illustrated by block diagram 300 of FIG. 3, where Locations of Interest (LOI) 310-320 are distributed as shown and are associated with URLs that are registered within registry 332. Mobile Web server 302 receives regular updates of its own position as discussed above and is in communication with gateway 304 via connection 322 to report any relevant location and telemetry data and any content/data that may be requested by browser 336. Similarly, other mobile Web servers (not shown) provide their respective location/telemetry information to gateway 304, so that gateway 304 may keep an up-to-date indexed list of all hosted mobile Web servers.

Figure 4:
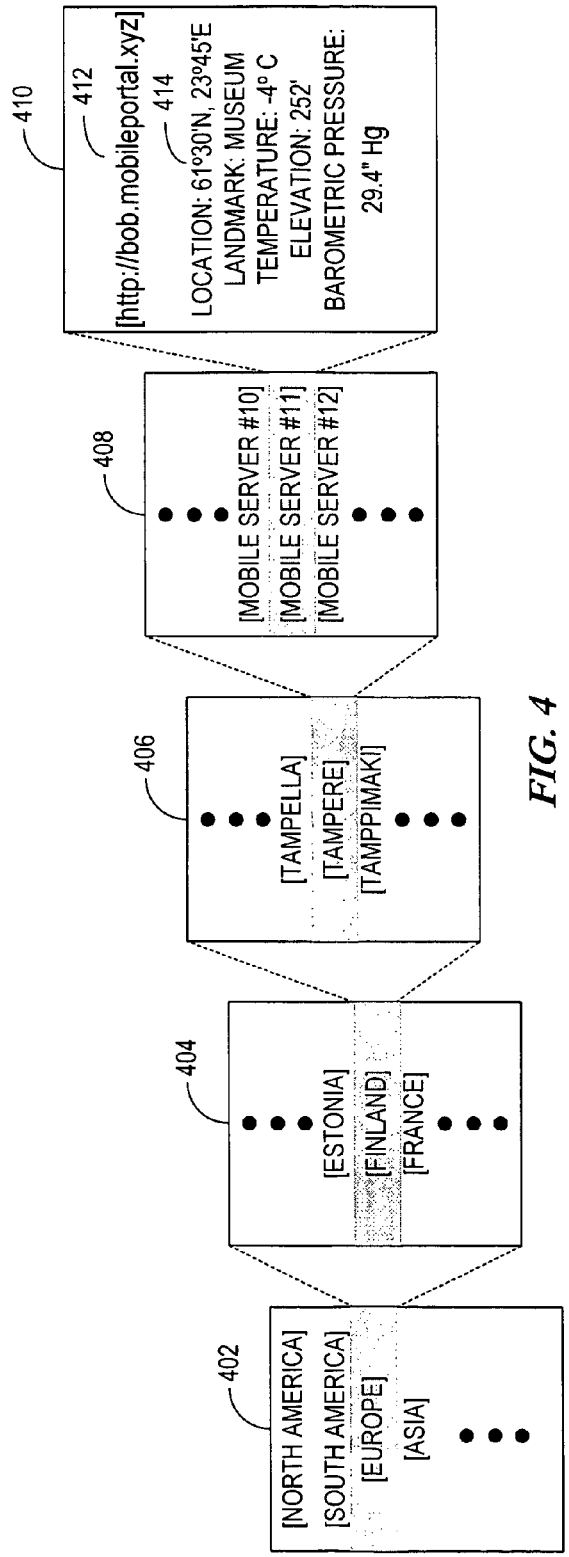
FIG. 4 illustrates an exemplary indexed list in accordance with the present invention.

Browser 336, in cooperation with search engine 306 and registry 332, may send an HTTP request to gateway 304 via path 324 requesting an indexed report of all mobile Web servers currently being hosted by gateway 304. Gateway 304 may fill the request by first providing a URL to indexed list 402 of FIG. 4 that provides a list of all hosted mobile Web servers by continent, e.g., [North America], [South America], [Europe], etc., to browser 336. By clicking on each continent's name, browser 336 receives a new URL from gateway 304 pointing to a list of mobile Web servers that are operating in the continent's respective countries, such as exemplified by list 404. Next, an indexed listing of cities within the selected country is provided to browser 336 as illustrated by list 406. Finally, a list of mobile Web servers 408 is presented to browser 336, indicating an indexed list of all mobile Web servers operating in the European city of Tampere, Finland.

A final click on the URL represented by the [MOBILE SERVER #11] entry within indexed list 408, instantiates window 410 onto browser 336. Window 410 lists URL "http://bob.mobileportal.xyz" 412 that is associated with, for example, mobile Web server 302 of FIG. 3. Along with the URL identifications other telemetry information 414 may be presented in window 410, such as location, temperature, elevation, and barometric pressure, etc. Thus, by simply clicking on the appropriate mobile Web server of indexed list 408, browser 336 may receive real-time telemetry updates from the associated mobile Web server. If an operator of browser 336 wishes to receive a virtual weather report for Viikinsari island, for example, then the operator may simply peruse the list of mobile Web servers 408 until a mobile Web server located at Viikinsari island is found. Once found, telemetry data 414 for the respective mobile Web server provides the information needed to determine whether a picnic on the beach of Viikinsari island is a wise idea. As will be discussed in more detail below, should a mobile Web server not be found in the location of interest, the operator of browser 336 may instead invoke a discovery procedure, whereby mobile Web servers in the proximity of, for example, mobile Web server 302 that are not currently being hosted by gateway 304 may nevertheless be located and similarly queried.

Figure 5:
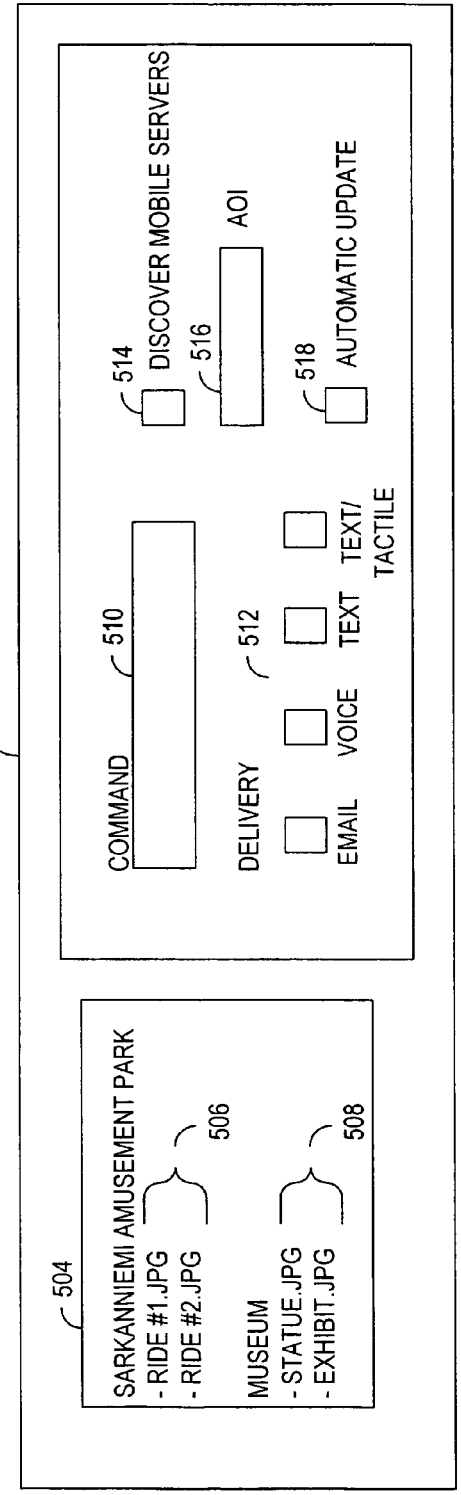
FIG. 5 illustrates an exemplary mobile Web server configuration window in accordance with the present invention.

A final click on URL 412 via browser 336 instantiates configuration window 502 onto browser 336 as illustrated in FIG. 5. Configuration window 502 allows a limited amount of control to be exercised over mobile Web server 302 from browser 336. In particular, browser 336 may instantiate a download of content/data, via paths 322 and 324, that is locally stored within mobile Web server 302. Local content/data that is available from within mobile Web server 302 is indicated, for example, by the directory listing of block 504. As can be seen, four .jpg files exist within directory listing 504, which are publicly offered by mobile Web server 302, to anyone who may be interested in downloading pictures, e.g., 506 taken of rides found at the Sarkanniemi Amusement Park or pictures 508 of exhibits found at the Museum.

Figure 6:
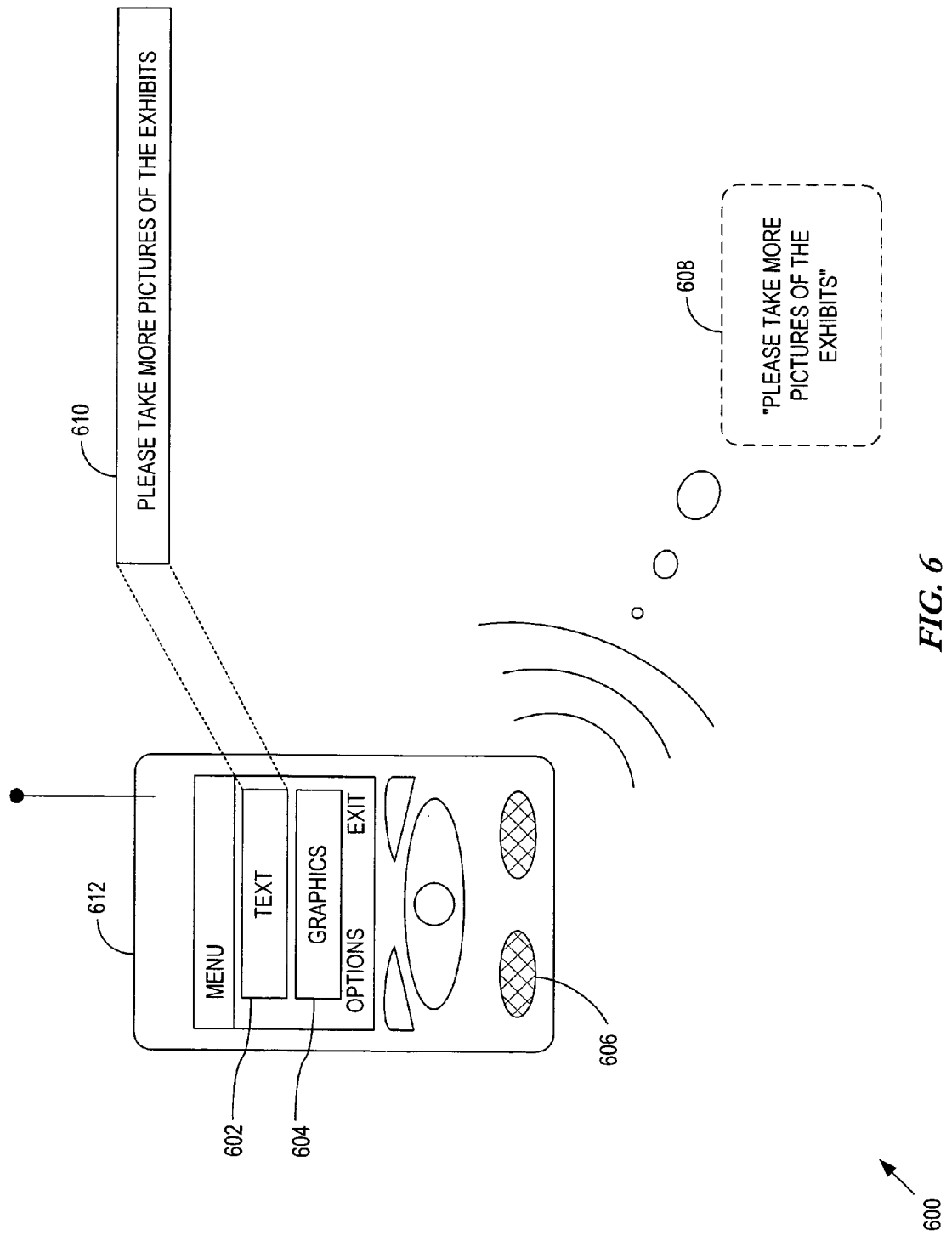
FIG. 6 illustrates an exemplary message delivery to a mobile Web browser in accordance with the present invention.

In addition, configuration window 502 facilitates a mechanism, whereby browser 336 may have an influence on the content/data that is provided by mobile Web server 302. In particular, command text field 510 allows entry of textual commands that are to be provided to mobile Web server 302 via browser 336. For example, since the operator of browser 336 is aware that mobile Web server 302 is currently visiting the museum as illustrated by telemetry data 414, the operator of browser 336 may request additional pictures to be taken of the museum exhibitions by simply typing the command "Please take more pictures of the exhibits" into command text field 510. The operator of browser 336 is further provided an opportunity to select the delivery mechanism 512 that is to be utilized to deliver the message as exemplified in FIG. 6.

Should the operator of browser 336 select a voice delivery to mobile Web server 302, as selected through the VOICE option in delivery options 512 for example, the message received by mobile Web server 302 may be combined with Text to Speech (T2S) technology, such that the owner of mobile Web server 302 may audibly receive the request for additional pictures to be taken of the exhibits. In other words, the textual portions of command 510 may be detected by the T2S of mobile Web server 302 and audibly presented to its owner via speakers 606 of mobile Web server 612. Alternatively, if the operator of browser 336 has voice capture technology available; then a voice message to the owner of mobile Web server 302 may instead be used. On the other hand, the owner of mobile Web server 302 may have selected personal configuration options that preclude the use of verbal commands to influence content/data delivery. In such an instance, the operator of browser 336 may instead choose non-invasive means to influence content/data capture and delivery.

For example, the operator of browser 336 may choose to influence the owner of mobile Web server 612 by sending textual message 610 that is to be displayed in textual display area 602. In such an instance, the operator of browser 336 may also choose to provide a tactile indication to the owner of mobile Web server 612 upon receipt of the message, should the owner of mobile Web server 612 allow such a tactile queue. Other less invasive request modes may also be offered, such as email delivery, which would allow the owner of mobile Web server 302 the luxury to fill the content/data capture requests at some point in the future. In such an instance, once the content/data capture request has been fulfilled, the user of browser 336 may request an automatic update via option 518, such that once the requested data is available, it will automatically be downloaded to browser 336, or conversely, an indication of its existence will be forwarded to browser 336.

It should be noted, that appropriate security measures may be taken, such that browser 336 may first be authenticated prior to being allowed access to mobile Web server 302. Even after successful authentication, however, the owner of mobile Web server 612 may have the option to challenge the user of browser 336 prior to acceptance of the content/data request. For example, if the user of browser 336 is operating camera enabled equipment, then the owner of mobile Web server 612 may first request the user of browser 336 to take a snapshot of himself/herself, in order to visually verify, via graphics presentation 604, that the requestor is in fact a preferred requesting entity. If, for whatever reason, the owner of mobile Web server 612 refuses such a content/data request, then the user of browser 336 may or may not be given notice of such a rejection. Audible means may also be employed for the owner of mobile Web server 302 to challenge the requesting entity.

Returning to FIG. 2, an AOI may be submitted with a content/data request, whereby all mobile Web server locations within the AOI, as well as all known Locations of Interest (LOI) within the AOI, may be indexed and reported to requesting entities 220 and 222 via gateway 206. Such an operation may be invoked, for example, through the use of command block 514, in conjunction with AOI block 516. In particular, if the requesting entities 220 and 222 are rejected access to mobile Web server 208, then through the use of AOI 516 and the Symbian GT/Apache discovery mechanisms within mobile Web server 208, discovery of other mobile Web servers 210 in the proximity region of mobile Web server 208 may be facilitated.

With respect to FIG. 3, the proximity region of mobile Web server 302 may be defined by radius 330. Radius 330 sweeps an arc that defines an AOI to be used during the discovery of proximately located mobile Web servers. Thus, the AOI region may be defined by browser 336 through operation of AOI 516, which may be used to define the length of radius 330. If radius 330 is defined such that the AOI surrounding mobile Web server 302 overlaps the AOI as defined by mobile Web server 334, then mobile Web server 334, that is not otherwise associated with gateway 304, may nevertheless be discovered by mobile Web server 302 and subsequently reported to gateway 304 upon receipt of the DISCOVER MOBILE SERVERS command 514. Once discovered and reported by mobile Web server 302, mobile Web server 334 may become a visiting mobile Web server to gateway 304, in which case communication path 328 may be instantiated between mobile Web server 334 and gateway 304 to allow proper indexing of telemetry and content/data associated with mobile Web server 334.

It should be noted that the configuration of the mobile Web servers in accordance with the present invention may be extremely flexible. For example, the type of indexing data that is transmitted to gateway 304 by mobile Web servers 302 and 334 may be subject to configuration by an intelligent configuration agent (not shown) within either of gateway 304 or mobile Web servers 302, 334. In one embodiment, instead of indexing mobile Web servers based on their hierarchically derived locations as exemplified in FIG. 4, other indexing options, such as indexing by data type, may be implemented by the intelligent configuration agent.

For example, if the user of browser 336 is not interested in any specific locations of the mobile Web servers, but is instead interested in any mobile Web servers that may be attending a live rock music concert, then the user of browser 336 may invoke gateway 304 to conduct a search for all mobile Web servers that meet that criteria. Gateway 304 may then interrogate all known indexing criteria concerning each of its hosted mobile Web servers in order to locate those mobile Web servers currently in attendance at a live rock concert. In the event that the necessary indexing criteria is not available to make such a determination, gateway 304 may dynamically modify operation of the intelligent configuration agent, so that appropriate indexing data may be obtained to make the determination.

For example, the intelligent configuration agent may be modified to access presence information, or personal configuration settings, associated with each mobile Web server such that proper indexing of the mobile Web servers is possible. Alternately, gateway 304 may combine indexing information received from its hosted mobile Web servers with information received from other sources within the network to make the determination. For example, gateway 304 may access a database within network 204 of FIG. 2, for example, containing the times and venues of all rock concerts currently underway anywhere in the world. Combining this information with location information of its hosted mobile Web servers, gateway 304 may identify those mobile Web servers that are currently attending one or more of the ongoing rock concerts and subsequently report them to the user of browser 336.

Since gateway 304 actively administers access requests from requesting entities, as well as a plethora of indexing data concerning its hosted mobile Web servers, gateway 304 is in a unique position to offer metrics concerning its hosted mobile Web servers that may be of interest. For example, gateway 304 may index its hosted mobile Web servers in order of most popular to least popular, in order to gain an understanding of the relative success of its hosted mobile Web servers. In addition, various characteristics of the mobile Web servers may be obtained, in order to gain an understanding of the reason(s) of their popularity. For example, a particular wall paper, or tile configuration, being utilized by the Web page of each mobile Web server may be obtained by gateway 304 in order to gain metrics concerning the aesthetic value of its mobile Web servers.

In one embodiment, the gathering of indexing information by gateway 304 of a mobile Web server may be substantially transparent to the owner of the mobile Web server. In such an instance, merely maintaining the mobile terminal in a powered-on state is all that the owner must do in order to allow indexing of his or her mobile terminal as a mobile Web server. In another embodiment, gateway 304 may query the owner of one or more mobile Web servers in order to gain additional indexing information that may otherwise not be available. In another embodiment, the mobile Web servers may voluntarily offer indexing information to their respective gateways as a method to register their content/data capabilities, so that the gateway may more effectively index the mobile Web servers according to their current context.

Figure 7:
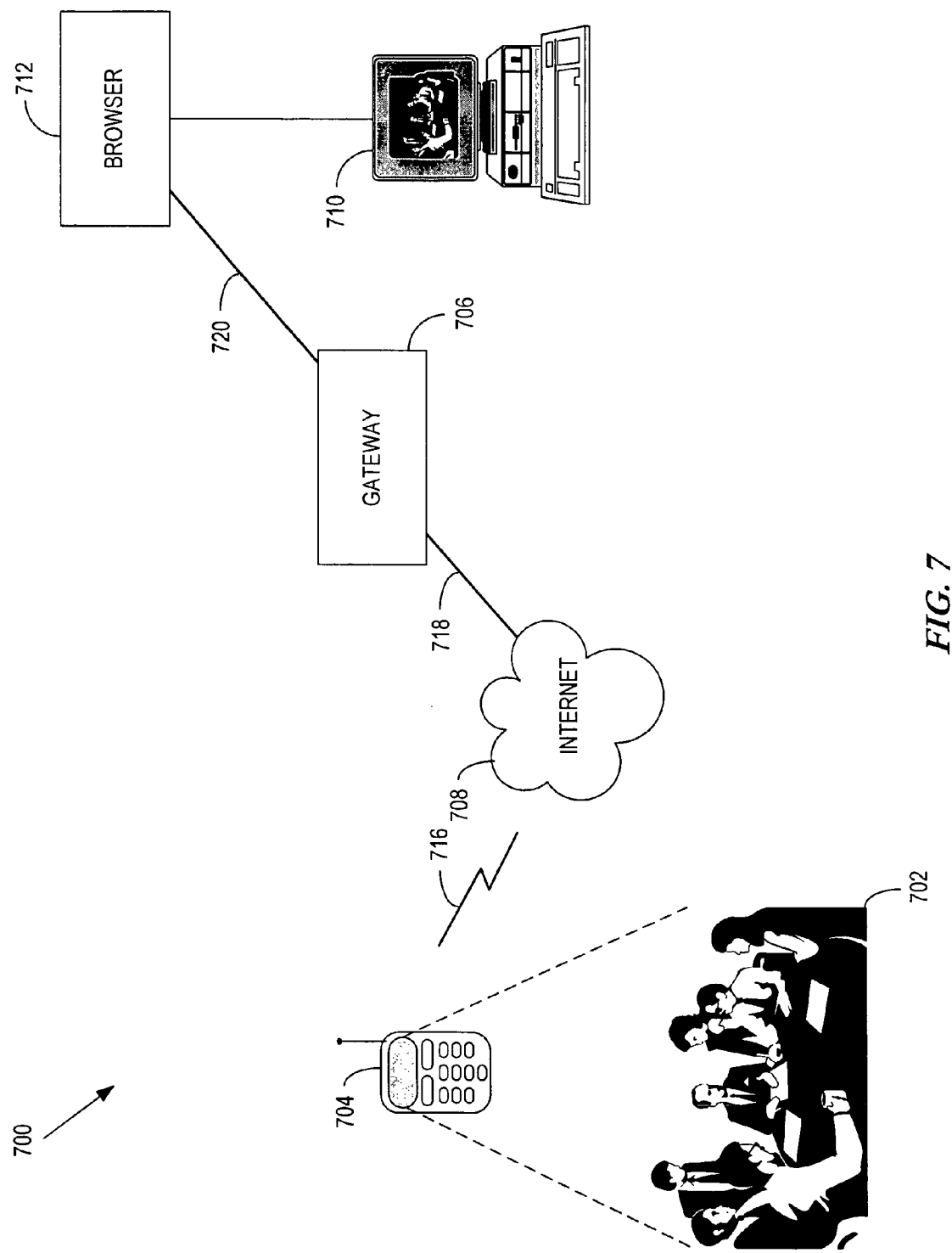
FIG. 7 illustrates an exemplary application of a mobile Web server in accordance with the present invention.

For example, in an alternate embodiment according to the present invention, video conferencing scenario 700 of FIG. 7 may be facilitated by mobile Web server 704. In such an instance, the context of mobile Web server 704 as a supplier of video and/or audio content in support of meeting 702 may be of interest to other users 710 of Internet 708. In such an instance, mobile Web server 704 may register itself to gateway 706 via Internet 708 as an audio/video stream provider in support of meeting 702. Taking the registration information, gateway 706 may then add mobile Web server 704 to a list of mobile Web servers that are currently engaged in audio/video streaming of meeting content. Such a list may then be accessed via browser 712, which may appear to the user of PC 710 as a list similar to list 408 as exemplified in FIG. 4.

For example, the user of PC 710 may have first requested a list of mobile Web servers hosted by gateway 706 that are conducting meeting operations within a particular corporation. The list may progressively be refined by gateway 706 as the user of PC 710 progressively refines the search criteria. First, a list of all countries where the corporation has a place of business may be listed as in list 402 of FIG. 4. Next, the user may select Finland as exemplified by list 404 and may progressively refine the search to include only those mobile Web servers in operation within the corporation's headquarters located, for example, in Helsinki, Finland. Once located, the user may select the mobile Web server, e.g., 704, that is conducting audio/video meeting support for meeting 702 as exemplified by the mobile Web server selection exemplified by list 408.

Once mobile Web server 704 is identified, the user may browse to the URL associated with mobile Web server 704 to instantiate a configuration window similar to configuration window 502 of FIG. 5. In such an instance, a link to the audio/video stream content relating to meeting 702 may be found in directory listing 504. Simply by clicking on the link, the user of PC may begin to receive audio and/or video feeds, as captured by mobile Web server 704, via gateway 706. The embodiment of FIG. 7 may be beneficial when meeting group 702 and the user of PC 710 are spatially removed from one another, such as may be the case when a corporation has a number of production and engineering facilities that are geographically located across the globe from one another. In a particular case, for example, meeting group 702 may represent a group of high-level management personnel located within the Finland based corporation who have assembled to conduct a video conference with other senior managers 710 located at other locations.

It can be seen, therefore, that the present invention is useful in any number of various scenarios where content/data provided by a mobile Web server may be offered to land based and mobile based requesting entities, while also providing an opportunity for the land based and mobile based requesting entities to influence the content/data that is offered by the mobile Web servers.

Figure 8:
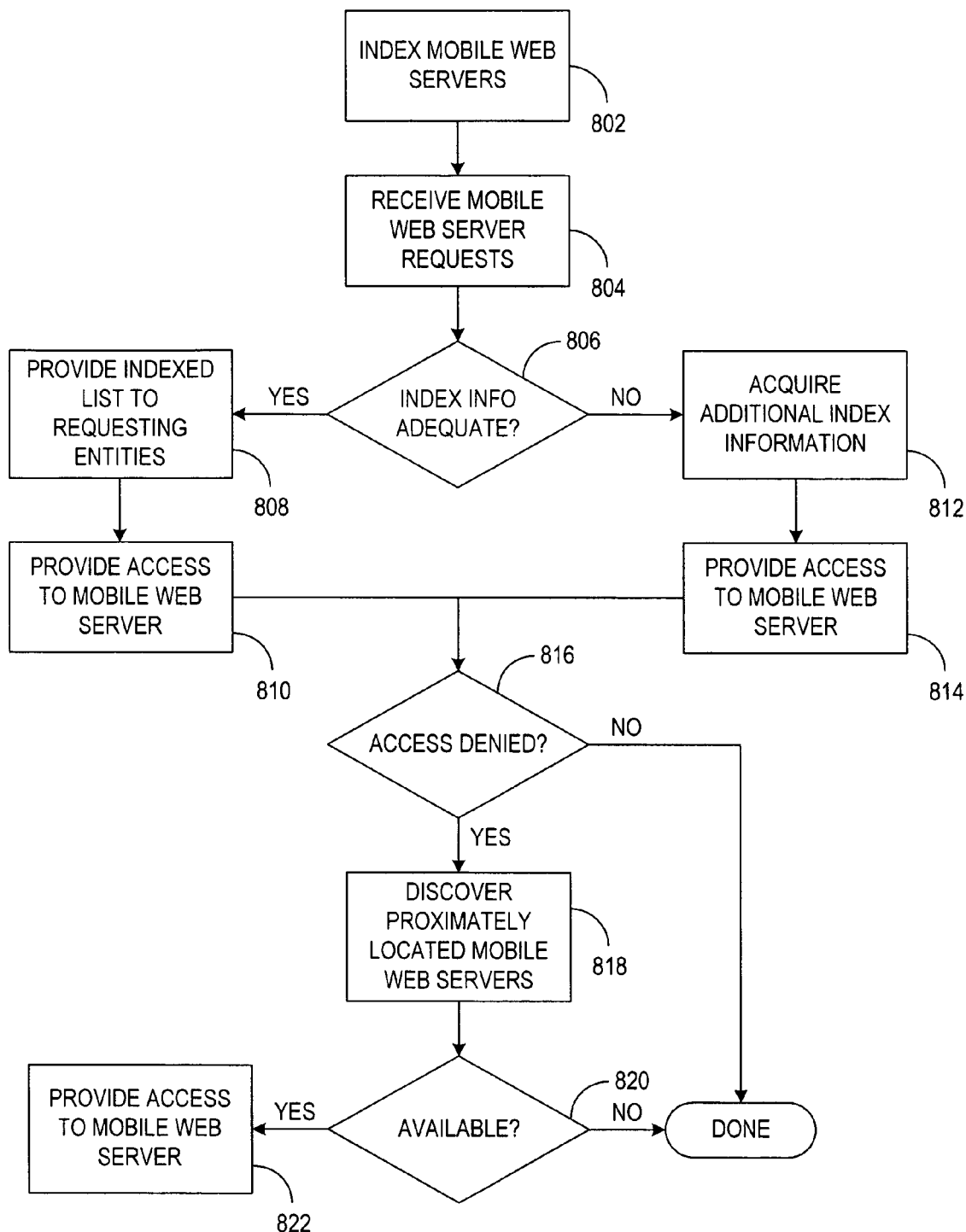
FIG. 8 illustrates a flow diagram of an exemplary method in accordance with the present invention.

FIG. 8 illustrates an exemplary flow diagram of a method that facilitates the use of mobile Web servers in accordance with the present invention. In step 802, mobile terminals that are available to operate as mobile Web servers provide indexing information to their respective sponsoring gateways. The indexing information provided by the mobile Web servers is highly configurable and may include information such as location and other telemetry based information such as temperature, elevation, barometric pressure, etc. Indexing information may also include the class of service, or type of data, that is offered by the mobile Web server. Still other indexing information may include personal configuration data, or presence information, that may be associated with the particular mobile Web server. The indexing of mobile Web servers may involve transparent operation of an intelligent configuration agent that either resides within the mobile Web server, or that may be uploaded to the mobile Web server by the hosting gateway. Indexing of the mobile Web servers may also involve active participation of the owner of the mobile Web server in a registration mode, whereby the owner apprises the gateway concerning a content gathering activity that may be of interest to requesting entities within the landline or wireless networks.

Once indexed, the availability of the mobile Web servers may be offered to requesting entities in response to requests received by the gateway from the requesting entities as in step 804. If the previously indexed information concerning the hosted mobile Web servers is adequate to meet the requests as determined in step 806, then an indexed list of compliant mobile Web servers is provided to the requesting entities as in step 808. The lists may be hierarchical in nature, whereby the requesting entities may traverse progressively tailored lists of mobile Web servers by clicking on URL links representative of the progressively tailored lists. Once a mobile Web server has been identified by a requesting identity, a link representing a URL to the mobile Web server is made available to the requesting entity. The link, when followed, allows the requesting entity to perform downloads of content/data already contained within the mobile Web server. In addition, the link provides a control mechanism, such as configuration window 502 of FIG. 5, to allow the requesting entity to influence the content/data that is to be provided by the mobile Web server.

If, on the other hand, the current indexed list does not provide an adequate amount of information to the requesting entities to facilitate selection of the appropriate mobile Web server, then the hosting gateway may accumulate additional information concerning the hosted mobile Web servers through operation of an intelligent configuration agent as in step 812. Such an agent may reside within the gateway, within the mobile Web server, or conversely may be distributed among the various network entities involved. Once the additional information has been ascertained, it is then provided to the requesting entities as in step 814 for subsequent URL access.

As discussed above, while the requesting entities may have found an adequate mobile Web server to suit their needs, the mobile Web server may nevertheless deny access to the requesting entities in step 816 through operation of an authentication failure, or simply through a manual rejection of the request by the owner of the mobile Web server. In such an instance, a discovery process may be performed by the rejecting mobile Web server, whereby proximately positioned mobile Web servers may be located. If other mobile Web servers are located and available as determined in step 818 and 820, then the requesting entity may alternatively be vectored to the proximately located mobile Web server and seamlessly serviced as in step 822.

Figure 9:
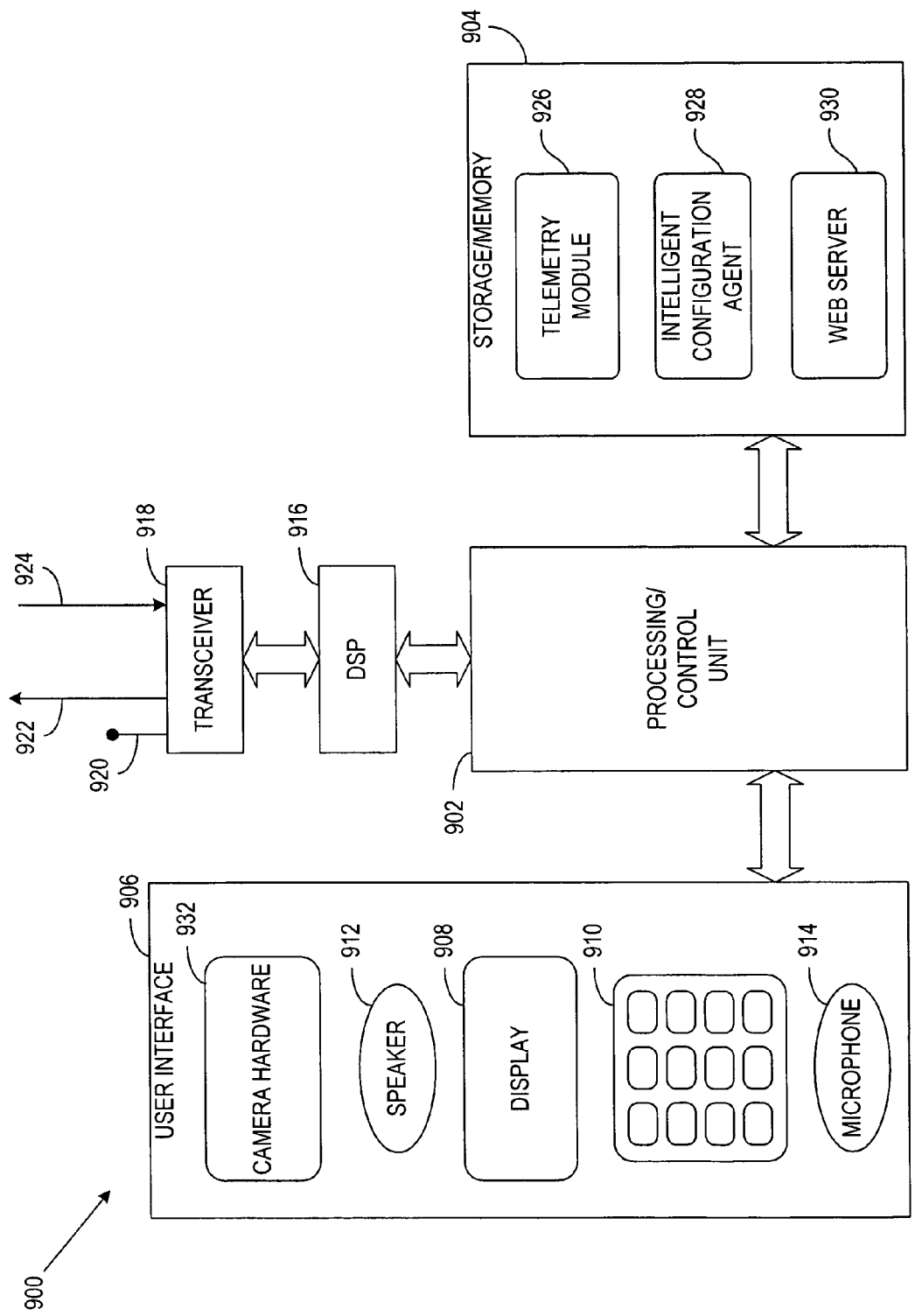
FIG. 9 illustrates a representative mobile computing arrangement suitable for mobile Web server functionality in accordance with the present invention.

The invention is a modular invention, whereby processing functions within either a mobile terminal or a hardware platform may be utilized to implement the present invention. The mobile terminals may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various location based functions described herein. An example of a representative mobile terminal computing system capable of carrying out operations in accordance with the invention is illustrated in FIG. 9. Those skilled in the art will appreciate that the exemplary mobile computing environment 900 is merely representative of general functions that may be associated with such mobile devices, and also that landline computing systems similarly include computing circuitry to perform such operations.

The exemplary mobile computing arrangement 900 suitable for mobile Web server functions in accordance with the present invention may be associated with a number of different types of wireless devices. The representative mobile computing arrangement 900 includes a processing/control unit 902, such as a microprocessor, reduced instruction set computer (RISC), or other central processing module. The processing unit 902 need not be a single device, and may include one or more processors. For example, the processing unit may include a master processor and associated slave processors coupled to communicate with the master processor.

The processing unit 902 controls the basic functions of the mobile terminal, and also those functions associated with the present invention as dictated by telemetry module 926, intelligent configuration agent 928, and Web server 930 available in the program storage/memory 904. Thus, the processing unit 902 in conjunction with telemetry module 926 is capable of providing location and other telemetry data used by the hosting gateway. In addition, the processing unit 902 in conjunction with intelligent configuration agent 928 allows cooperation with the hosting gateway to accumulate adequate indexing such that the services, content, and/or data may be discovered by the requesting entities. Once discovered, the processing unit 902 in conjunction with Web server 930 facilitates Web server functionality to be provided by mobile computing arrangement 900. The program storage/memory 904 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 904 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 900 via data signals, such as being downloaded electronically via one or more networks, such as the Internet and an intermediate wireless network(s).

The processor 902 is also coupled to user-interface 906 elements associated with the mobile terminal. The user-interface 906 of the mobile terminal may include, for example, a display 908 such as a liquid crystal display, a keypad 910, speaker 912, camera hardware 932, and microphone 914. These and other user-interface components are coupled to the processor 902 as is known in the art. Other user-interface mechanisms may be employed, such as voice to command converters, text to voice converters, switches, touch pad/screen, graphical user interface using a pointing device, trackball, joystick, or any other user interface mechanism.

The mobile computing arrangement 900 also includes conventional circuitry for performing wireless transmissions. A digital signal processor (DSP) 916 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 918, generally coupled to an antenna 920, transmits the outgoing radio signals 922 and receives the incoming radio signals 924 associated with the wireless device.

The mobile computing arrangement 900 of FIG. 9 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a mobile Web server based system and method in accordance with the present invention.

Figure 10:
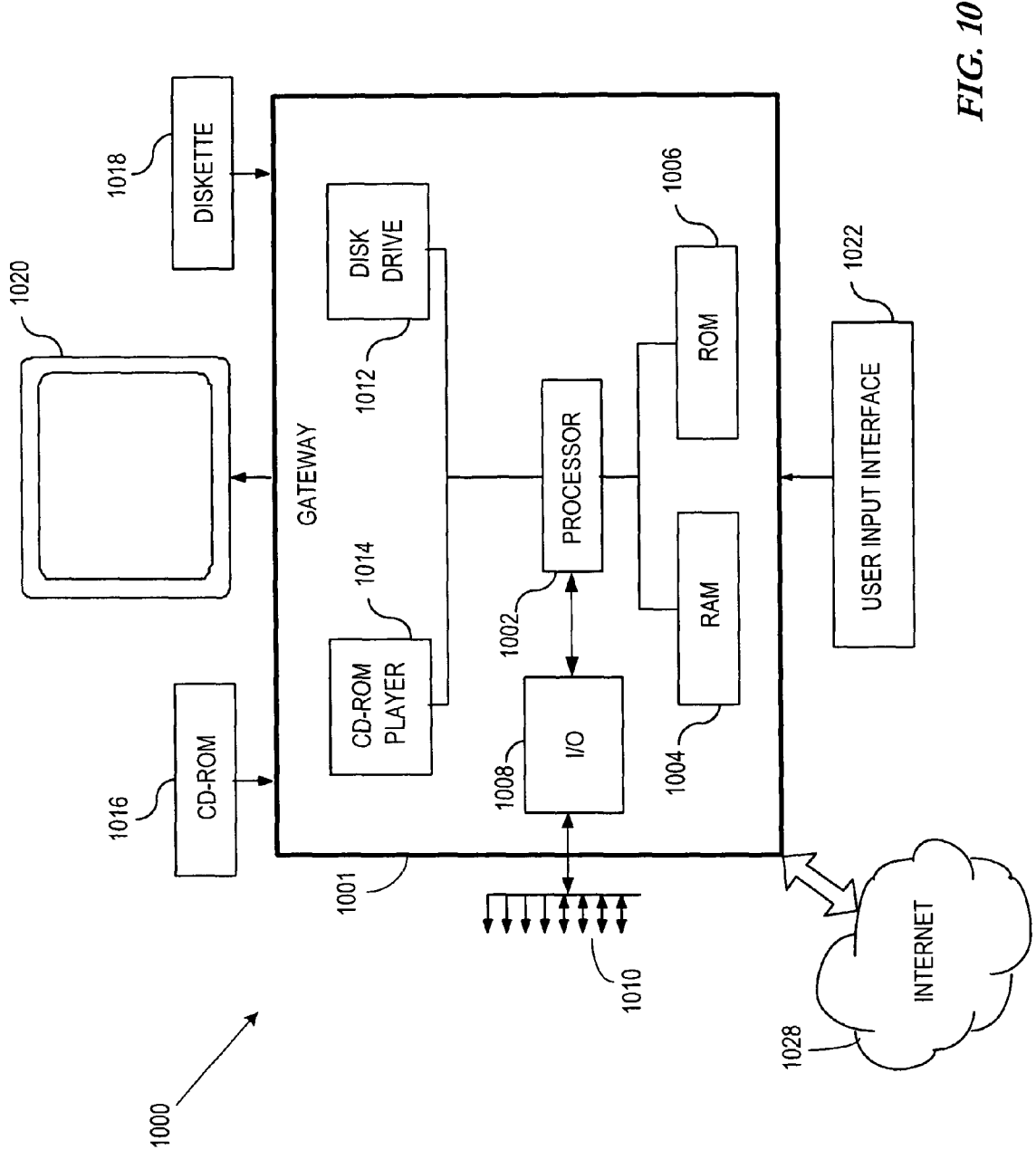
FIG. 10 is a representative computing system capable of carrying out gateway functions according to the present invention.

The gateway platforms or other systems for providing gateway functions in connection with the present invention may be any type of computing device capable of processing and communicating digital information. The gateway platforms utilize computing systems to control, host, and manage the mobile Web server activity. An example of a representative computing system capable of carrying out operations in accordance with the invention is illustrated in FIG. 10. Hardware, firmware, software or a combination thereof may be used to perform the various mobile Web server based functions and operations described herein. The computing structure 1000 of FIG. 10 is an example computing structure that can be used in connection with such a gateway platform.

The example computing arrangement 1000 suitable for performing the gateway activity in accordance with the present invention includes gateway 1001, which includes a central processor (CPU) 1002 coupled to random access memory (RAM) 1004 and read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. For example, data received from I/O connections 1008 or Internet connection 1028 may be processed in accordance with the present invention. External data storage devices may be coupled to I/O circuitry 1008 to facilitate gateway functions according to the present invention. Alternatively, such databases may be locally stored in the storage/memory of gateway 1001, or otherwise accessible via a local network or networks having a more extensive reach such as the Internet 1028. The processor 1002 carries out a variety of functions as is known in the art, as dictated by software and/or firmware instructions.

Gateway 1001 may also include one or more data storage devices, including hard and floppy disk drives 1012, CD-ROM drives 1014, and other hardware capable of reading and/or storing information such as DVD, etc. In one embodiment, software for carrying out the gateway operations in accordance with the present invention may be stored and distributed on a CD-ROM 1016, diskette 1018 or other form of media capable of portably storing information. These storage media may be inserted into, and read by, devices such as the CD-ROM drive 1014, the disk drive 1012, etc. The software may also be transmitted to gateway 1001 via data signals, such as being downloaded electronically via a network, such as the Internet. Gateway 1001 is coupled to a display 1020, which may be any type of known display or presentation screen, such as LCD displays, plasma display, cathode ray tubes (CRT), etc. A user input interface 1022 is provided, including one or more user interface mechanisms such as a mouse, keyboard, microphone, touch pad, touch screen, voice-recognition system, etc.

Gateway 1001 may be coupled to other computing devices, such as the landline and/or wireless terminals via a network. The gateway may be part of a larger network configuration as in a global area network (GAN) such as the Internet 1028, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method comprising:
compiling a list of mobile online sites;
receiving one or more requests from requesting entities within a network;
indexing a group of mobile online sites in response to the one or more requests; and
providing access to the indexed group of mobile online sites, wherein access to a selected mobile online site of the indexed group of mobile online sites is optionally provided to the requesting entities by the selected mobile online site.

2. The method of claim 1, further comprising accumulating information associated with each mobile online site.

3. The method of claim 2, further comprising accumulating location data associated with a position of each mobile online site.

4. The method of claim 3, further comprising accumulating data types associated with data stored within each mobile online site.

5. The method of claim 4, further comprising receiving one or more requests for mobile online sites having a particular data type stored within the mobile online sites.

6. The method of claim 5, further comprising generating a list of mobile online sites having data types that corresponds to the particular data type requested by the requesting entity.

7. The method of claim 3, further comprising receiving one or more requests for mobile online sites at a particular location.

8. The method of claim 7, further comprising generating a list of mobile online sites having a position that corresponds to the particular location requested by the requesting entity.

9. The method of claim 1, further comprising:
selecting one of the indexed group of mobile online sites; and
providing a directory of data files contained within the selected mobile online site.

10. The method of claim 9, further comprising allowing selection of at least one of the data files in the directory, and in response, downloading the contents of the data file to the requesting entities.

11. The method of claim 1, further comprising:
selecting one of the indexed group of mobile online sites; and
providing a configuration window associated with the selected mobile online site.

12. The method of claim 11, further comprising providing a command field to allow the requesting entities to deliver commands to the selected mobile online site.

13. The method of claim 12, further comprising providing a delivery option field to allow selection of delivery options for the delivered commands.

14. The method of claim 1, further comprising providing access to non-indexed mobile online sites in response to a denial of access by the selected mobile online site.

15. The method of claim 14, further comprising providing access to mobile online sites in proximity to the selected mobile online site.

16. The method of claim 15, further comprising configuring the selected mobile online site to conduct a search for the proximately located mobile online sites.

17. A system, comprising:
a plurality of mobile terminals located within the a mobile online site based content system, each mobile terminal hosting online site functionality having attributes indicative of a context of the mobile terminal as an online site;
a gateway coupled to the plurality of mobile terminals and adapted to index the attributes of the plurality of mobile terminals into an attribute list; and
a requesting entity coupled to the gateway and adapted to send one or more requests to a portion of the plurality of mobile terminals having attributes that correspond to the attribute list,
wherein the portion of the plurality of mobile terminals are adapted to send data to the requesting entity in response to the one or more requests.

18. The system of claim 17, wherein the attributes include a location attribute indicative of a position of the mobile terminal.

19. The system of claim 18, wherein the attributes further include a content attribute indicative of a data type contained within the mobile terminal.

20. The system of claim 17, wherein each mobile terminal comprises an intelligent configuration agent coupled to the gateway and adapted to provide the attributes to the gateway.

21. The system of claim 17, further comprising a browser adapted to send the one or more requests to Uniform Resource Locators (URLs) associated with the portion of mobile terminals.

22. An apparatus comprising:
means for receiving location updates from a plurality of mobile terminals, each of the plurality of mobile terminals hosting online site functionality;
means for receiving context specific information from the plurality of mobile terminals;
means for providing a list of the location and the context specific information associated with the plurality of mobile terminals to a network; and
means for receiving one or more requests for data from the network in response to the provided list.

23. The apparatus of claim 22, further comprising means for providing the one or more requests for data to the plurality of mobile terminals.

24. The apparatus of claim 23, further comprising means for receiving responses from the plurality of mobile terminals in response to providing the one or more requests for data to the plurality of mobile terminals.

25. A non-transitory computer-readable medium carrying one or more instructions which, when executed by one or more processors, cause an apparatus to at least perform the following steps:
    receiving location updates from a plurality of mobile terminals, each of the plurality of mobile terminals hosting online site functionality;
    receiving context specific information from the plurality of mobile terminals;
    providing a list of the location and the context specific information associated with the plurality of mobile terminals to the network; and
    receiving one or more requests for data from the network in response to the provided list.

26. The non-transitory computer-readable medium of claim 25, wherein the apparatus is further caused to perform providing the one or more requests for data to the plurality of mobile terminals.

27. The non-transitory computer-readable medium of claim 26, wherein the apparatus is further caused to perform receiving responses from the plurality of mobile terminals in response to providing the one or more requests for data to the plurality of mobile terminals.

28. An apparatus comprising:
    at least one processor; and
    at least one memory including computer program code, the at least one memory and the computer program code configured to, with the at least one processor, cause the apparatus to perform at least the following:
    compile a list of mobile online sites;
    receive one or more requests from requesting entities within the network;
    index a group of mobile online sites in response to the one or more requests; and
    provide access to the indexed group of mobile online sites, wherein access to a selected mobile online site of the indexed group of mobile online sites is optionally provided to the requesting entities by the selected mobile online site.

29. The apparatus of claim 28, wherein the apparatus is further caused to accumulate location data associated with a position of each mobile online site.

30. The apparatus of claim 29, wherein the apparatus is further caused to receive one or more requests for mobile online sites at a particular location and having a particular data type stored within the mobile online sites.

31. The apparatus of claim 28, wherein the apparatus is further caused to perform the following stem
    select one of the indexed group of mobile online sites; and
    provide a directory of data files contained within the selected mobile online site.

32. The apparatus of claim 28, wherein the apparatus is further caused to perform the following steps:
    select one of the indexed group of mobile online sites; and
    provide a configuration window associated with the selected mobile online site.

* * * * *